US012689221B2

(12) United States Patent
Scheuerell

(10) Patent No.: US 12,689,221 B2
(45) Date of Patent: Jul. 21, 2026

(54) SYSTEMS AND METHODS FOR PARALLELING MULTIPLE POWER SOURCES

(71) Applicant: Cummins Power Generation Inc., Minneapolis, MN (US)

(72) Inventor: Mike James Scheuerell, Stillwater, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/986,347

(22) Filed: Dec. 18, 2024

(65) Prior Publication Data

US 2025/0239862 A1      Jul. 24, 2025

Related U.S. Application Data

(63) Continuation of application No. 17/928,151, filed as application No. PCT/US2021/034782 on May 28, 2021, now Pat. No. 12,212,145.

(60) Provisional application No. 63/032,191, filed on May 29, 2020.

(51) Int. Cl.
| | |
|---|---|
| *H02J 3/46* | (2026.01) |
| *H02J 3/16* | (2006.01) |
| *H02J 3/32* | (2026.01) |
| *H02J 3/38* | (2006.01) |

(52) U.S. Cl.
CPC ................. *H02J 3/46* (2013.01); *H02J 3/16* (2013.01); *H02J 3/32* (2013.01); *H02J 3/381* (2013.01)

(58) Field of Classification Search
CPC ...... H02J 1/106; H02J 1/14; H02J 3/16; H02J 3/28; H02J 3/32; H02J 3/38; H02J 3/381; H02J 3/46; H02J 3/48; H02J 3/50
See application file for complete search history.

(56) References Cited

U.S. PATENT DOCUMENTS

| | | | |
|---|---|---|---|
| 5,483,153 A | 1/1996 | Leeb et al. | |
| 5,731,688 A | 3/1998 | Thomson | |
| 6,522,030 B1 * | 2/2003 | Wall ..................... | H02M 7/493 |
| | | | 307/57 |

(Continued)

FOREIGN PATENT DOCUMENTS

| | | |
|---|---|---|
| EP | 2 937 964 A1 | 10/2015 |
| WO | WO-2012/015507 A1 | 2/2012 |

OTHER PUBLICATIONS

El-Saadany, E., "Adaptive Decentralized Droop Controller to Preserve Power Sharing Stability of Paralleled Inverters in Distributed Generation Microgrids," IEEE Transactions on Power Electronics, Dec. 2008, 12 pages.

(Continued)

*Primary Examiner* — Levi Gannon
(74) *Attorney, Agent, or Firm* — Foley & Lardner LLP

(57) ABSTRACT

Systems and methods for managing loads on a power grid are provided. In some embodiments, the load control system includes one or more power sources connected to a power grid. A method includes determining, by a first genset connected to a power grid, a power average at a first rate, and generating, by the first genset, a filtered power average. The filtered average includes the power average at a second rate. The filtered power average is used in the control algorithm to balance the load share of power sources on the power grid.

20 Claims, 9 Drawing Sheets

(56) References Cited

U.S. PATENT DOCUMENTS

| | | | |
|---|---|---|---|
| 9,484,850 | B2 | 11/2016 | Hyypio et al. |
| 9,709,964 | B2 | 7/2017 | Schultz |
| 10,103,666 | B1 | 10/2018 | Fan et al. |
| 2009/0108676 | A1 | 4/2009 | Algrain |
| 2014/0062199 | A1 | 3/2014 | Martinez |
| 2014/0265354 | A1 | 9/2014 | Folken et al. |
| 2014/0316604 | A1 | 10/2014 | Ortjohann et al. |
| 2016/0111879 | A1 | 4/2016 | Ayana et al. |
| 2017/0222437 | A1 | 8/2017 | Pratt et al. |
| 2018/0019593 | A1 | 1/2018 | Dent |
| 2018/0076661 | A1 | 3/2018 | Herbener |
| 2019/0044342 | A1 | 2/2019 | Pande et al. |
| 2019/0103743 | A1 | 4/2019 | Sun et al. |
| 2020/0301383 | A1 | 9/2020 | Reddy |

OTHER PUBLICATIONS

International Search Report and Written Opinion for International Application No. PCT/US2021/034782 mailing date Sep. 29, 2021, 11 pages.

Krstic, B. et al., "Distributed Storage Inverter and Legacy Generator Integration Plus Renewables Solution for Microgrids," ESTCP Project EW-201245, Jan. 2, 2015, 118 pages.

Marwali, M. et al., "Control of Distributed Generation Systems—Part II: Load Sharing Control," IEE Transactions on Power Electronics, vol. 19, No. 6, Nov. 2004, pp. 1551-1561.

Mohanpurkar, M. et al., "Real-time Modeling and Testing of Microgrid Management System for the Blue Lake Rancheria—Performance Assurance Report," Idaho National Labortory, Nov. 2017, 54 pages.

* cited by examiner

200

201
Determine a power average at a first power source

202
Transmit the power average of the first power source to other power sources within system 203
Adjust operating parameters to achieve optimal operating conditions

501

Access voltage and frequency response of gensets on a power grid

502

Detect a transient event on the power grid

503

Adjust voltage and frequency output in order to prevent tripping

601 — Determine that a power save mode of a device should be enabled

602 — Enter power save mode

603 — Determine that the device is needed for grid stability and connect to the power grid

SYSTEMS AND METHODS FOR PARALLELING MULTIPLE POWER SOURCES

CROSS-REFERENCE TO RELATED APPLICATIONS

The present application claims is a continuation of U.S. patent application Ser. No. 17/928,151, filed Nov. 28, 2022, which is a National Phase of a PCT Application No. PCT/US2021/034782, filed May 28, 2021, which claims priority to and the benefit of U.S. Provisional Patent Application No. 63/032,191, filed May 29, 2020, which are incorporated herein by reference in its entirety for all purposes.

TECHNICAL FIELD

The present disclosure relates generally to electric power transmission. More particularly, the present disclosure relates to systems and methods for controlling power on a power grid.

BACKGROUND

On a power or utility grid, there may be one or more sources of energy (e.g., generators, wind turbines, gas turbines, steam turbines) that are designed to supply power to one or more loads. For example, a grid (e.g., micro-grid, utility grid, etc.) may include two or more generators in parallel to three or more loads. However, micro-grids are often difficult to setup and maintain, require a specialized skillset, and considerable time to deploy.

SUMMARY

One implementation is related to a method, the method includes determining, by a first genset connected to a power grid, a power average at a first rate, and generating, by the first genset, a filtered power average. The filtered power average includes the power average at a second rate. The filtered power average is used in a load control algorithm to balance the load share of power sources on the power grid. In some embodiments, the load control algorithm is operated at the second rate. In some embodiments, the second rate is slower than the first rate. In some embodiments, the first genset may generate the filtered power average by low pass filtering the power average determined at the first rate.

The method may further include receiving, at a second genset via the network, the filtered power average, and adjusting, at the second genset, the power output of the second genset such that a filtered power average of the second genset is adjusted toward the filtered power average of the first genset. The adjusting the power output of the second genset may include increasing the power output of the second genset in response to determining that the filtered power average of the second genset is lower that the filtered power average of the first genset. The adjusting the power output of the second genset may include decreasing the power output of the second genset in response to determining that the filtered power average of the second genset is higher that the filtered power average of the first genset.

In some embodiments, the method may also include receiving, at an energy storage system (ESS) via the network, the filtered power average, and adjusting, at the ESS, set points of a droop curve of the ESS, wherein the set points affect the response of the ESS to sensed electrical parameters on the power grid. The adjusting the set points of the droop curve may include setting the set points to a maximum charge configuration in response to the filtered power average being below a lower threshold. The lower threshold may be indicative that the first genset is at minimum load requirement of the first genset. In some embodiments, the adjusting the set points of the droop curve may include setting the set points to a maximum discharge configuration in response to the filtered power average being above an upper threshold.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
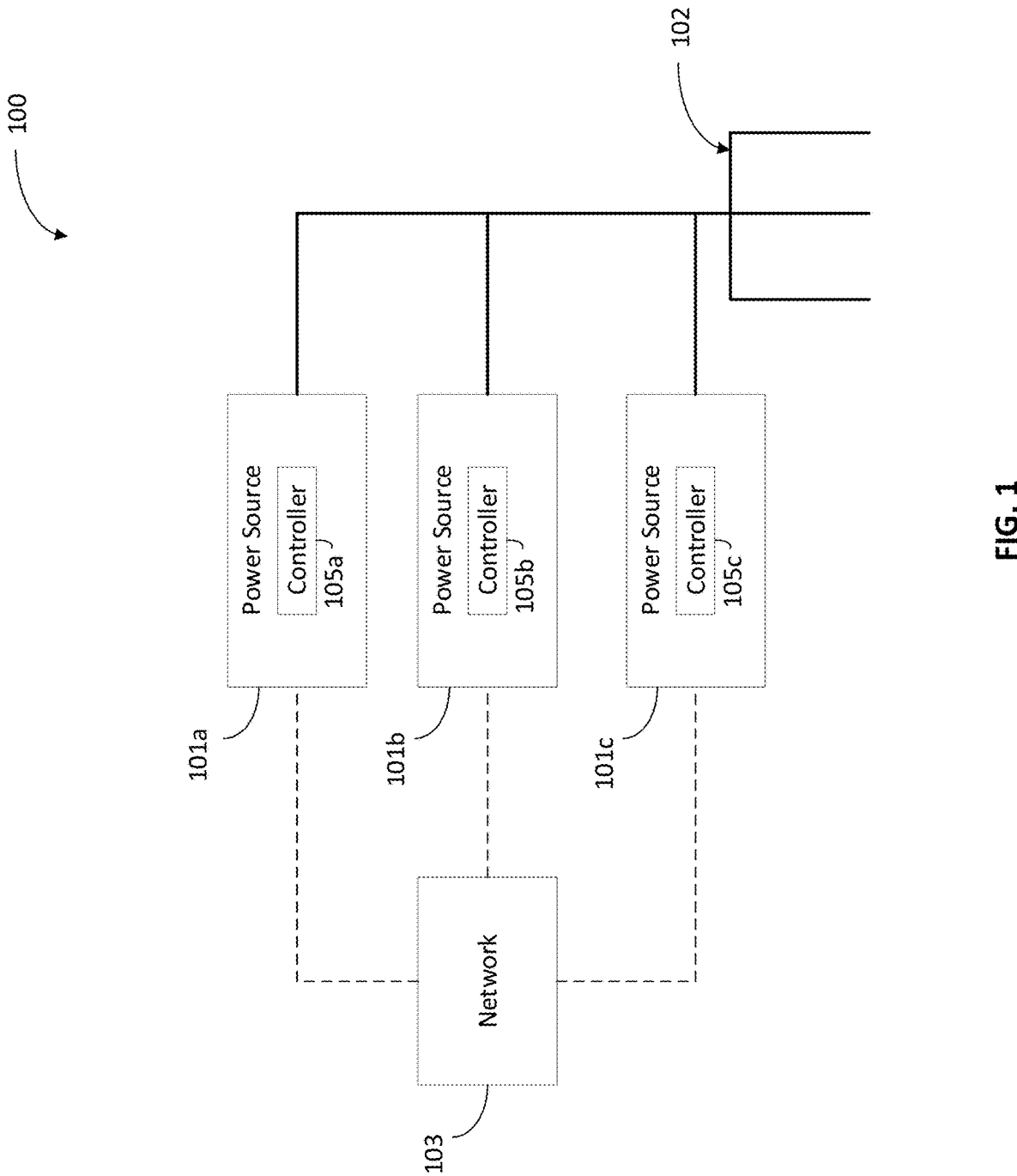
FIG. 1 is a block diagram illustrating a load control system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods for controlling power on a power grid is provided according to exemplary embodiments. A system includes one or more power sources connected to a power grid. The power grid may further be connected to one or more loads. In some embodiments, the power sources may include generator sets ("gensets", including, for example, a combination of an engine and an alternator), energy storage systems (ESSs), one-way power sources (e.g., solar power sources, wind power sources), and/or other types of power sources. In some embodiments, the system may include multiple gensets connected in parallel to the power grid. In order to ensure that the power output at each genset is balanced with the other gensets, the gensets may communicate with one another. However, the bandwidth of some networks may limit the ability for the multiple power sources to communicate with an update rate sufficient enough to both maintain stability of the electrical parameters on the power grid and balance the load shared by each power source in real-time. Accordingly, to conserve bandwidth, a load share control algorithm of each power source may be slowed down and attenuated. In this way, each power source may be configured to react, via a first algorithm, at a first rate (e.g., 50 Hz) for adjusting respective power outputs in response to electrical parameters deviating from nominal values in attempt to maintain grid stability and each power source may be configured to react or adjust a respective power output, via the load share control algorithm, toward a nominally balanced steady state at a second rate (e.g., 1 Hz). In this way, transient events are effectively handled open-loop (e.g., via each power source reacting with minimal influence from the conditions of the other power sources) and the load share control algorithm is configured to drive the system toward a nominally balanced steady state at the second rate.

For example, in an embodiment, a load share control algorithm of a first genset may be slowed down or attenuated to the second rate (e.g., 1 Hz). The first genset may be configured to update or re-calculate a power average at a first rate (e.g., 50 Hz). The power average at the first rate and detected electrical parameters on the grid (e.g., frequency and voltage) may be used by the first genset in a first algorithm in attempt to keep the electrical parameters sensed on the power grid at or near nominal values (e.g., 60 Hz and/or 120 Vrms). The first genset may filter the power average (e.g., updated at 50 Hz) via a low pass filter having a cutoff frequency at one half of the second rate in order to generate a filtered power average. The filtered power average may then be used in the load share control algorithm (e.g., along with other filtered power averages received from other power sources and at the second rate) in order to adjust the power output of the first genset such as to balance the load sharing of the power sources within the system. The filtered power average of the first genset may also be transmitted to the other power sources via a network (e.g., which may similarly have a load control algorithm operating at or near the second rate) and the elimination of the higher frequency components of the power averages reduces the amount of bandwidth needed on the network. Accordingly, the systems and methods described herein allow the multiple power sources to maintain stability of the power grid while also balance the load toward a nominal steady state. In this way, the systems and methods described herein simplify the integration of power sources into power grids (e.g., micro grids) by reducing the need for a high bandwidth network and ensuring that all power sources connected to the power grid are operating optimally according to respective strengths. Further, the systems and methods reduce the expense, time, and maintenance in setting up micro grids while also allowing for renewable power sources (e.g., solar or wind) to be integrated into the micro grid.

Referring to FIG. 1, a block diagram illustrating a load control system 100 is shown according to an exemplary embodiment. The load control system 100 includes one or more power sources 101a-c, a power grid 102, and a network 103 (e.g., a communications network). Although three power sources 101a-c are depicted it is to be appreciated that in some embodiments additional or fewer power sources 101a-c may be implemented in the system 100.

The power sources 101a-c may be connected to the power grid 102 in parallel. That is, the power sources 101a-c each are configured to electrically connect to the power grid 102 (e.g., common terminal or common terminals depending upon type of power and particular applications). In some embodiments, the respective output terminals of the power sources 101a-c may be connected to the common bus via a transfer switch, fuse, ATS, or other contact that may be used to electrically connect and disconnect the respective power source from the power grid 102. In some embodiments, a power source may include a generator, a generator set, a turbine, power plant, solar power, battery device, energy storage system (ESS) or any device or system that is configured to supply electrical power to the power grid 102.

The power sources 101a-c are communicably coupled to the network 103 and configured to transmit and receive data via the network 103 to other power sources 101a-c in the system. In some embodiments, the network 103 is a digital communications network. The network 103 may include one or more routers, switches, or other communications hardware that is configured to route information between the power sources 101a-c, a server system, and/or the internet.

Each of the power sources 101a-c include a controller 105. The controller 105 may include one or more processors, a memory device, sensors, and an input/output interface. The memory may be configured to store machine executable instructions thereon that, when executed by the one or more processors, cause the processors to perform or assist in performing any of the operations, methods, or processes described herein. In some embodiments, the input/output interface is configured to allow the respective power source to communicate via the network or directly with other power sources. In some embodiments, the sensors are configured to monitor various operating parameters of the power source such as the current output power, the frequency or voltage at an output terminal (e.g., and thereby electrical parameter of power on the power grid), or other operating parameters of the power source. The controller 105 is configured to run a load share algorithm. The load share algorithms are generally configured to attempt to maximize the operating parameters of each of the power sources.

It is to be appreciated that the load share algorithm may include different operation parameters or goals depending upon the particular power sources. For example, a load share algorithm of a genset may be designed to attempt to match a current output power to total genset power capacity percentage of the genset (e.g., a power average of the genset) to the current output power to total genset power capacity percentage of the other gensets (e.g., a power average of the other gensets) in the system. That is, the load share algorithm of the gensets are configured to adjust power outputs of respective gensets such that all gensets in the system are equally sharing the load as a percentage of respective output capacities. In this way, the load share algorithm of the gensets reduce the potential for some gensets over working and some gensets receiving (e.g., instead of outputting) power, which ensures that the longevity and efficiency of the gensets are maximized.

In another example, an energy storage system (ESS) may have different load share algorithm parameters or goals. For example, in some embodiments, the ESS load share algorithm may dynamically set droop parameters such that the ESS can quickly and efficiently remove power (e.g., charge) when the frequency of the power grid is too high and supply power to the power grid when the frequency is too low. The amount of power that the ESS supplies or receives from the power grid may be expressed as a linear function relative to the frequency. In some embodiments, the ESS is configured to dynamically alter the linear function (e.g., slope) or set points according to the power averages of the other power sources. The droop function of the ESS is further discussed in reference to FIGS. 4A-4C.

In another example, a one-way power source such as wind or solar power in the system 100 may have other algorithm parameters or goals. For example, the one-way power source may also have droop parameters, however, with the exception that the one-way power sources may not receive power from the grid. The one-way power source may have a load share control algorithm that is configured to act according to the droop function. The droop function of the one-way power source is generally configured to curtail the output power of the one-way power source as the frequency on the power grid exceeds a nominal value (e.g., 60 Hz). The droop function of the one-way power source is further discussed in reference to FIG. 7.

Accordingly, the load share control algorithm of the gensets are configured to balance the load experienced by each of the gensets and the load share control algorithm of the ESS and one-way power sources (e.g., renewable power sources) are configured to quickly and efficiently absorb transients experienced on the power grid 102. The load share algorithms further allow for optimal operation parameters of each of the power sources after a time period after a transient event. For example, after the transient event, each of the gensets may iteratively or continuously adjust respective output powers to balance the loads, the one-way power source may iteratively or continuously work toward providing the maximum amount of power possible to the power grid 102 (e.g., maximum amount of renewable, clean power), and the ESS will either support the load, if needed, begin to recharge, or enter a standby mode (e.g., if fully charged and not needed to support the load). As such, the system provides a distributed topology of power sources within the grid that may communicate with one another in a low-bandwidth network and do not require a supervisory controller to maintain stability and optimal operating states, which reduces the cost and complexity of implementing the power sources within power grid or micro-grid.

As an example of the communication over the network 103, in some embodiments, the power sources 101a-c are configured to determine respective power averages and transmit the respective power averages to the other power sources 101a-c within the system 100. The power average may be the current power output of the power source relative to the total power capacity of the power source. For example, a power source 101a may be a genset with 100 kilowatts of power capacity. The power average for the power source 101a may be the current output of the power source (e.g., 1 kilowatt) divided by the power capacity (e.g., 10 kilowatts) and represented as a percentage (e.g., 10%). In some embodiments, a power source (e.g., a grid forming genset) may initially share an output capacity (e.g., kW and/or kVar) of the power source to the other power sources and the power average may be the current power output of the power source, which may then be used by the other power sources to calculate or determine respective current power outputs to match the percentage of the current power output of the power source relative to the power output capacity of the power source. In some embodiments, the power average may indicate the percentage of load experienced by the respective power source (e.g., generator set). In some embodiments, the power sources 101a-c may determine the respective power averages at a refresh rate (e.g., the number of times that the respective power average is updated or re-calculated per second) of 50 Hz. In some embodiments, the power sources 101a-c may have a refresh rate that is greater than or less than 50 Hz. The power sources 101a-c may filter the power average via a low pass filter in order to filter off the higher frequency components (e.g., transient events) of the power average to create a filtered power average. The filtered power average may be used on the respective power source for use in a load control algorithm and also transmitted to the other power sources.

For example, in some embodiments, a first power source 101a may update or re-calculate a respective power average at a rate of 50 Hz (e.g., update the respective power average 50 times per second) and pass the updated or re-calculated power average through a low pass filter (e.g., with a cutoff frequency of 0.5 Hz) in order to generate a filtered power average, and the filtered power average may be transmitted via the network to other power sources. In this way, the higher frequencies of the power average are filtered and a filtered power average can be transmitted via the network. Further discussion of the calculation and filtering of the power average is discussed below in reference to FIG. 2.

In some embodiments, the power sources 101a-c each communicate respective power averages to the other power sources 101a-c and the load control algorithm of each of the power sources 101a-c may work to balance out the power averages such that each of the power sources (e.g., generator sets) are operating at with maximized efficiency. For example, other gensets may use the power average to ensure that each genset is outputting a similar power average while also maintaining grid stability (e.g., stability of frequency and voltage on the power grid 102). The local load control algorithm is configured to adjust the power output of the respective genset in an attempt to ensure that all generator sets are sharing the load equally (e.g., such that each genset is outputting a similar percentage of power relative to respective output capacities). The local load control algorithm may operate on a loop at the second rate (e.g., 1 Hz).

In some embodiments, a first power source 101a may be designated as the grid former (e.g., a grid forming genset or grid forming ESS). That is, each controller 105 may be configured to either identify, communicate, or otherwise set a particular genset as the grid forming genset. In some embodiments, the largest genset within the system (e.g., connected to the power grid and online) is identified or set as the grid forming genset. In some embodiments, an indication of the grid forming genset is sent or programmed into the controllers of each of the gensets. In some embodiments, for example, where multiple gensets have the same total power capacity, the grid forming generator may be identified or designated as the genset with the lowest source address (e.g., lowest source address of the multiple gensets having the highest total output capacity). In some embodiments, for example, where multiple gensets have the same total power capacity, the grid forming generator may be identified or designated as the generator that has the highest power average (e.g., the generator experiencing the most load). In some embodiments, each controller identifies the grid forming genset. In some embodiments, a supervisory or master controller may designate the grid forming genset and communicate the designation to each of the controllers 105. In some embodiments, for example, where there are no gensets connected to the grid (e.g., or no eligible gensets because of anticipated disconnection or because the gensets are offline), an ESS may be identified or designated as the grid former.

The first power source 101a (e.g., the grid forming genset) may not run a load control algorithm. Rather, the first power source 101a may maintain the frequency and voltage of the electrical power on the power grid 102 within pre-determined ranges (e.g., +/−10% of 60 hertz, +/−10% 120 volts). The first power source 101a (e.g., the grid former) may then determine the power average (e.g., power average of the first power source 101a) and transmit the power average via the network 103 to the other power sources 101b-c in the system. The other power sources may then use the received power average of the first power source 101a to balance the load share and maintain grid stability. In some embodiments, the grid forming genset may limit a current power output locally at a high execution rate (e.g., 50 Hz) to prevent reverse power while balancing and to control ramp load and ramp unload. In some embodiments, each of the power sources 101*a-c* may limit a current power output locally at a high execution rate (e.g., 50 Hz) to prevent reverse power while balancing and to control ramp load and ramp unload.

Figure 2:
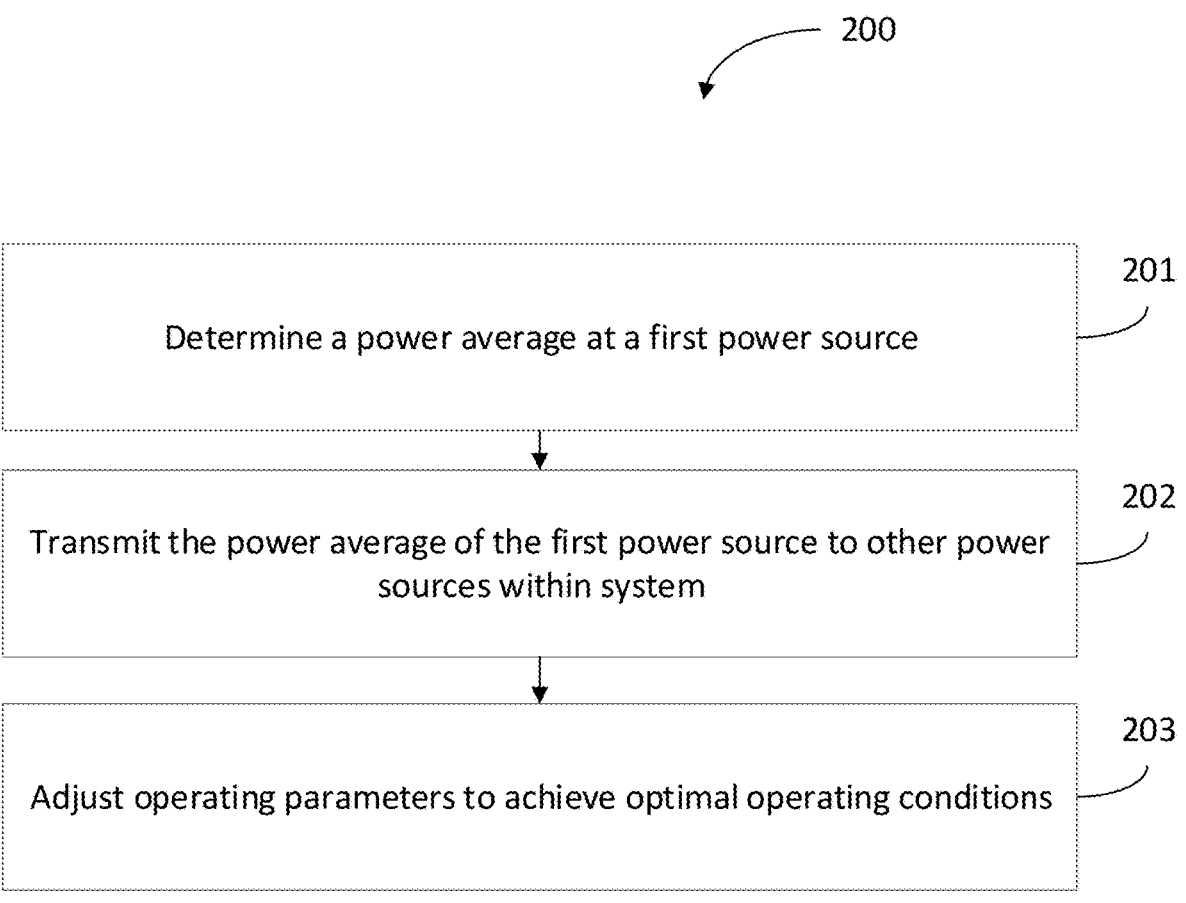
FIG. 2 is a flow diagram of a method of controlling power on a power grid according to an exemplary embodiment.

Referring now to FIG. 2, a flow diagram of a method 200 of controlling power on a power grid is shown according to an exemplary embodiment. In particular, the method 200 is directed toward achieving a nominally balanced steady state operating point (e.g., steady and optimized operating parameters of each power source) in a power grid via communicating over a network (e.g., a limited bandwidth network due to the state of current technology and costs of implementing a state-of-the-art network).

In operation 201, a first power source determines a power average (e.g., power average of the first power source). The first power source is connected to a power grid (e.g., a micro-grid) and may be experiencing a load. A controller of the first power source may determine the current output power of the first power source and determine the power average. The power average may be a percentage of the current output power of the first power source and the total capacity of the first power source. Further, the controller of the first power source may filter the power average such as to slow down the refresh rate of the power average. In some embodiments, the controller of the first power source filters (e.g., and/or slows the refresh calculation of) the power average to a refresh rate of less than a desired network rate. For example, in some embodiments, a network communicably coupled to the first power source may have limited bandwidth that is not suitable to transmit the power average at high frequencies (e.g., 50 Hz). The first power source may slow the refreshing or recalculation rate of the power average to a rate that is suitable to be transmitted on the network (e.g., 1 Hz). In addition, in some embodiments, the controller may filter the power averages via a low pass filter having a cutoff frequency of the network rate (e.g., the rate at which the network can transmit without having bandwidth issues) divided by 2. For example, if data (e.g., power averages) from the power sources can be sent and received at 1 hertz (Hz) over the network, the first power source may filter the power average with a low pass filter having a cutoff frequency of 0.5 Hz before transmitting the power average. Filtering the power average is discussed in further detail with respect to FIG. 3.

In an operation 202, the power average (e.g., determined or filtered power average) is transmitted from the first power source to the other power sources within the system via the network. The transmission may be done digitally via the network. In some embodiments, the power average is received by each of the other power sources and used to control the power (e.g., load sharing) on the power grid. In some embodiments, the other power sources may similarly determine respective power averages (e.g., filtered power averages to preserve bandwidth) and may transmit the respective power averages to multiple power sources on the power grid (e.g., including the first power source). In some embodiments, the first power source may also include an indication of the identity of the first power source such that the other power sources can identify which power source within the system the power average belongs to.

In an operation 203, the first power source and other power sources use the power average to achieve optimal steady state operating conditions (e.g., via a local load control algorithm operating at or near the second rate). That is, the power sources may use the power average in a local load control algorithm to try and match the power average such that each of the power sources are sharing the load of the power grid. For example, other gensets in the system may work to achieve a nominally balanced steady state operating point based on the filtered power average received from one or more of the other power sources and the local load control algorithm. In some embodiments, the first power source may be a grid forming genset. The grid forming genset may regulate the frequency and voltage on the power grid without adjusting the grid forming gensets load share.

For example, other gensets within the system may receive the power average (e.g., a filtered power average) from the first power source and use the filtered power average in a local load control algorithm (e.g., operating at or near the second rate) in attempt to match the filtered power average of the first power source (e.g., the grid forming genset). In an example where one or more of the other gensets have a higher power average than the power average of the first power source, the one or more of the other gensets may reduce respective power outputs in attempt to match the power average of the first power source. In response, the first power source may detect or determine that the frequency and voltage on the power grid is falling, and in turn, begin to output more power, thereby balancing the load share (e.g., by increasing the power average of the first power source and lowering the power average of the one or more other gensets). In another example, where one or more of the other gensets have a lower power average than the power average of the first power source, the one or more other gensets may increase respective power outputs. In response, the first power source may detect or determine that the frequency and voltage on the power grid is rising, and in turn, begin to decrease power output of the first power source, thereby balancing the load share (e.g., by increasing the power average of the other gensets and lowering the power average of the first power source). In some embodiments, the other gensets (e.g., gensets that are not the grid forming genset) may similarly calculate and filter respective power averages before comparing their respective power average to the power average of the first power source (e.g., the power average of the grid forming genset).

Figure 3:
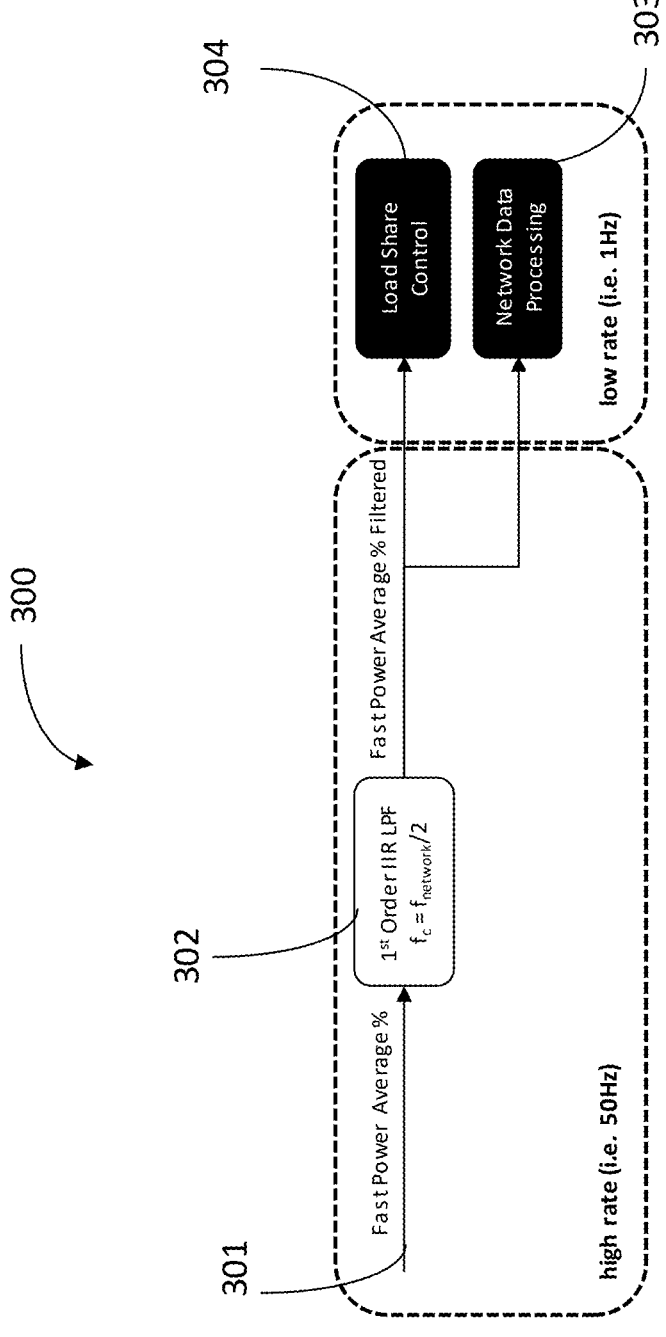
FIG. 3 is a diagram of filtering power averages of a power source according to constraints of a network according to an exemplary embodiment.

Referring now to FIG. 3, a diagram 300 of determining power averages of a power source according to constraints of a network is shown according to an exemplary embodiment. That is, the diagram depicts a process flow of a controller of a power source in determining a power average suitable for transmission over a limited bandwidth network.

The power source may calculate a power average at a first rate 301 (e.g., 50 Hz) that contains too high of frequencies for the network bandwidth to accommodate. The network rate that is a rate that allows for transmission of the power average over the limited bandwidth network. Accordingly, the load control algorithm may be set to a second rate that both accommodates the network rate (e.g., selected due to bandwidth constraints of the network) and the filtered power average may be filtered via a low pass filter having a cutoff frequency of one half of the second rate (e.g., which may be selected to be the network rate). The power source feeds the power average at the first rate 301 into a low pass filter 302 to remove frequency content greater than the network rate (e.g., 1 Hz) divided by 2. The low pass filter 302 may be a first order low pass filter with a cutoff frequency of the network rate divided by 2. The low pass filter 302 may then output the power average at the second rate (e.g., the filtered power average) to the other power sources via the network 303 and to a load share control algorithm 304 on the power source. The filtering ensures that the frequency content above the Nyquist frequency is removed before transmission, which increases the accuracy of the transmitted power average.

Figure 4A:
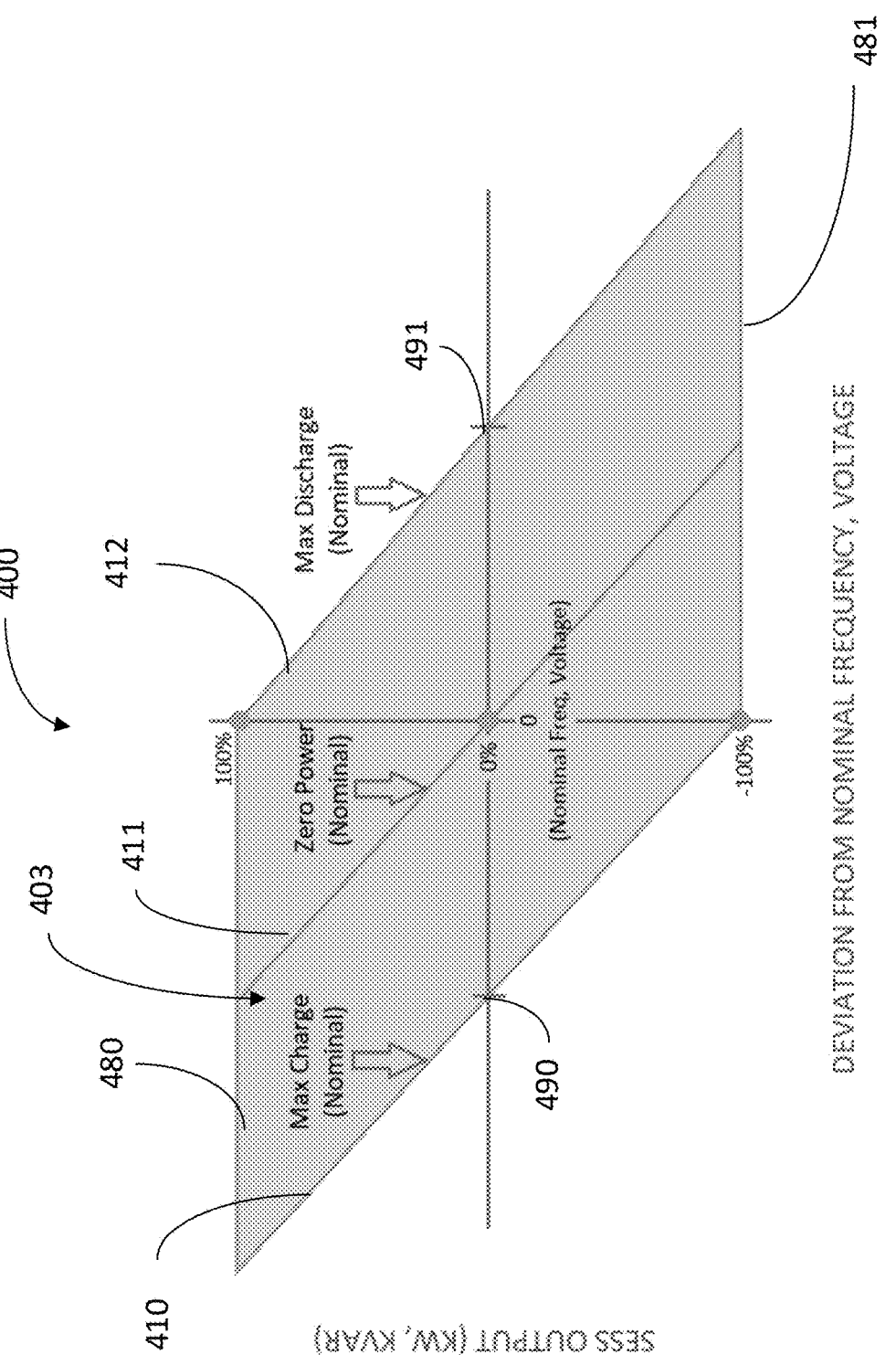
FIG. 4A is a droop diagram of an ESS according to an exemplary embodiment.

Referring now to FIG. 4A, a droop diagram 400 of an ESS is shown according to an exemplary embodiment. In particular, the droop diagram 400 depicts a various droop curve set points of an ESS that may be dynamically set or adjusted based on a received power average from a power source (e.g., a grid forming genset). The dynamic ESS droop curve set points allow for the ESS to provide support to the gensets (e.g., absorbing load via charging when the gensets are at or near minimum load requirements or providing power when the gensets are at or near maximum load capacities) and also absorbing transient events experienced on the power grid.

The droop diagram 400 has a y-axis 401 that indicates the output power of the ESS and an x-axis 402 that indicates sensed electrical parameters of power on the power grid (e.g., frequency and voltage). The droop diagram 400 includes an operating range 403. The operating range 403 indicates the potential power output reaction of the ESS relative to the electrical parameters of the grid. For example, for purposes of demonstration, a first curve 410, a second curve 411, and a third curve 412 within the operating range 403 are discussed in detail. The curves 410, 411, and 412 indicate how the ESS will react (e.g., output power or receive power from the power grid) in response to detecting that the frequency and/or voltage of the power grid are deviating from nominal values. It is to be appreciated that the curves 410, 411, and 412 are meant by way of example only and that there are a continuum of potential curves within the operating range. For additional reference, a top 480 of the operating range 403 indicates a maximum amount of power output (e.g., 100%) from the ESS to the power grid and a bottom 481 of the operating range 403 indicates a maximum amount of power consumption (e.g., −100%) of the ESS from the power grid.

The first curve 410 indicates a maximum charge droop state where the ESS is configured to charge (e.g., receive power from the grid) even if the frequency and/or voltage of the power grid are below nominal values. However, the ESS will output power if the frequency and voltage of the power grid fall below a lower threshold 490. The lower threshold may be minus 10% of the nominal frequency and voltage values.

The second curve 411 indicates a zero power droop state where the ESS is configured to charge (e.g., receive power from the grid) if the frequency and voltage of the power grid are above nominal values and output power to the power grid if the frequency and/or voltage of the power grid are below the nominal values. The nominal frequency and/or voltage may be set based on the particular application or location of the power grid.

The third curve 412 indicates a maximum discharge state where the ESS is configured to discharge (e.g., output power to the grid) even if the frequency and/or voltage of the power grid are above nominal values. However, the ESS will charge (e.g., receive power from the grid) if the frequency and/or voltage of the power grid are above an upper threshold 491. The lower threshold may be plus 10% of the nominal frequency and/or voltage values.

The ESS may dynamically choose which curve 410, 411, or 412 that the ESS will follow based on the power average received from the power source (e.g., grid forming genset). For example, if the grid forming genset has a low power average (e.g., indicating that the genset is not currently outputting a significant amount of power that may be close to violating a minimum load threshold of the grid forming genset), then the ESS may dynamically or automatically choose to follow the first curve 410 such that the ESS can charge and provide additional load. In another example, if the grid forming genset has a median power average (e.g., indicating the genset is outputting a median amount of power relative to capacity), then the ESS may dynamically or automatically choose to follow the second curve 411 such that ESS does not receive or output power when the frequency and voltage are at nominal values yet is still available to support transient events. In yet another example, if the grid forming genset has an high power average (e.g., indicating the genset is outputting a high amount of power relative to capacity), then the ESS may dynamically or automatically choose to follow the third curve 412 such that ESS is outputting a maximum amount of power when the frequency and voltage are at nominal values in attempt to support the grid forming genset (e.g., and thereby the other gensets since they are also iteratively working toward a nominal operating set point or balanced state).

The slope of the first, second, and third curves 410, 411, and 412 may be set or dynamically changed to be steep enough to achieve grid stability. The steepness of the curves may be dependent upon the particular power grid being implemented. For example, for an application where the ESS is deployed in a system with expected large transient events, the steepness of the curves may be increased to ensure that the ESS reacts accordingly to the large transient events. In other embodiments, the curves may be nonlinear. In some embodiments, the ESS may receive a command from a supervisory controller or other device to set the curve that the ESS will follow. In some embodiments, the ESS may limit instantaneous power output based on the short-term damage curves of the system. For example, the ESS may limit the instantaneous power by changing the slope of the droop curve beyond the rating of the system (e.g., change the slope to zero or near zero beyond the rating of the system).

Figure 4B:
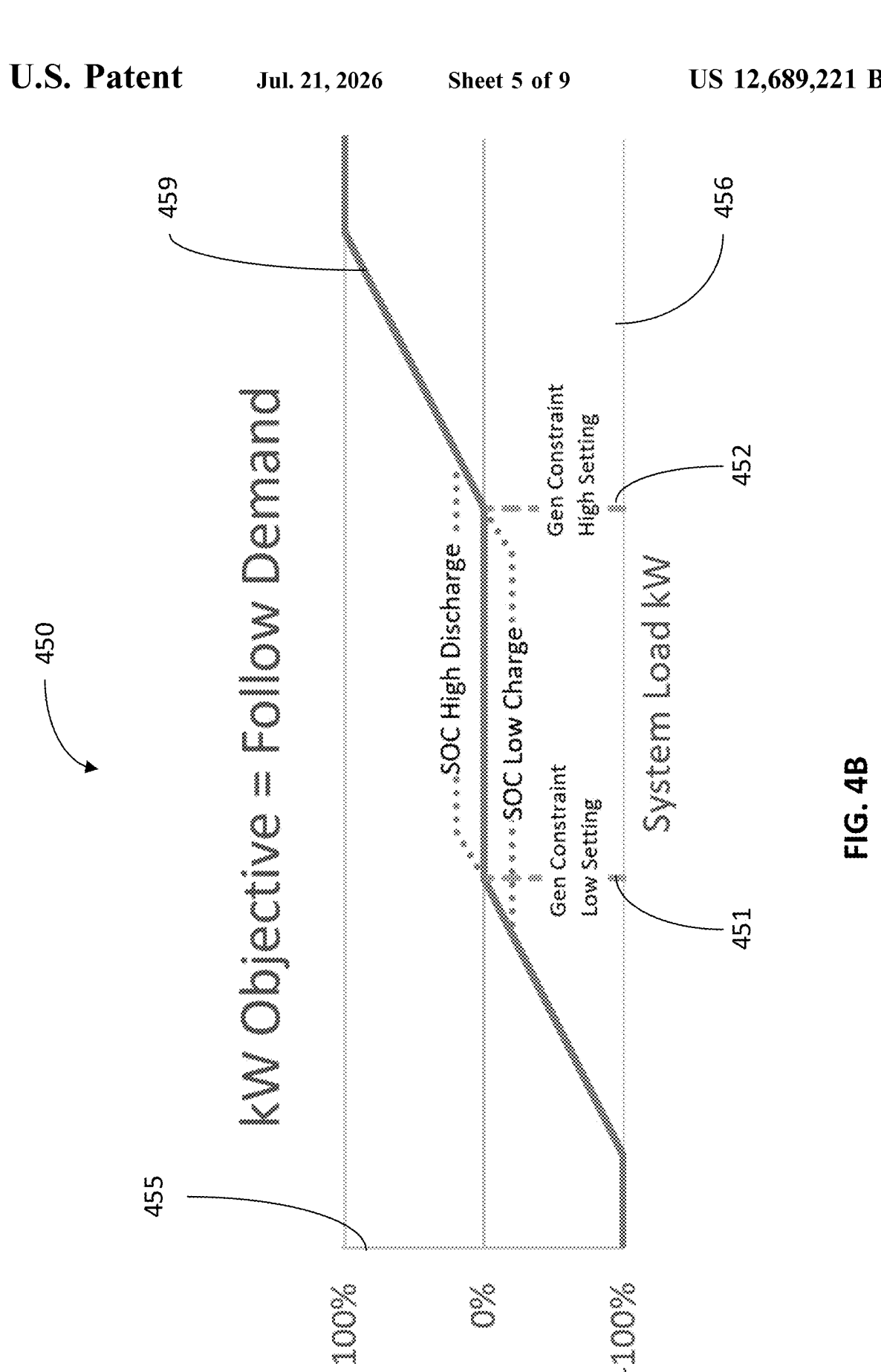
FIG. 4B depicts a droop curve of an ESS according to a first objective that is shown according to an exemplary embodiment.
Figure 4C:
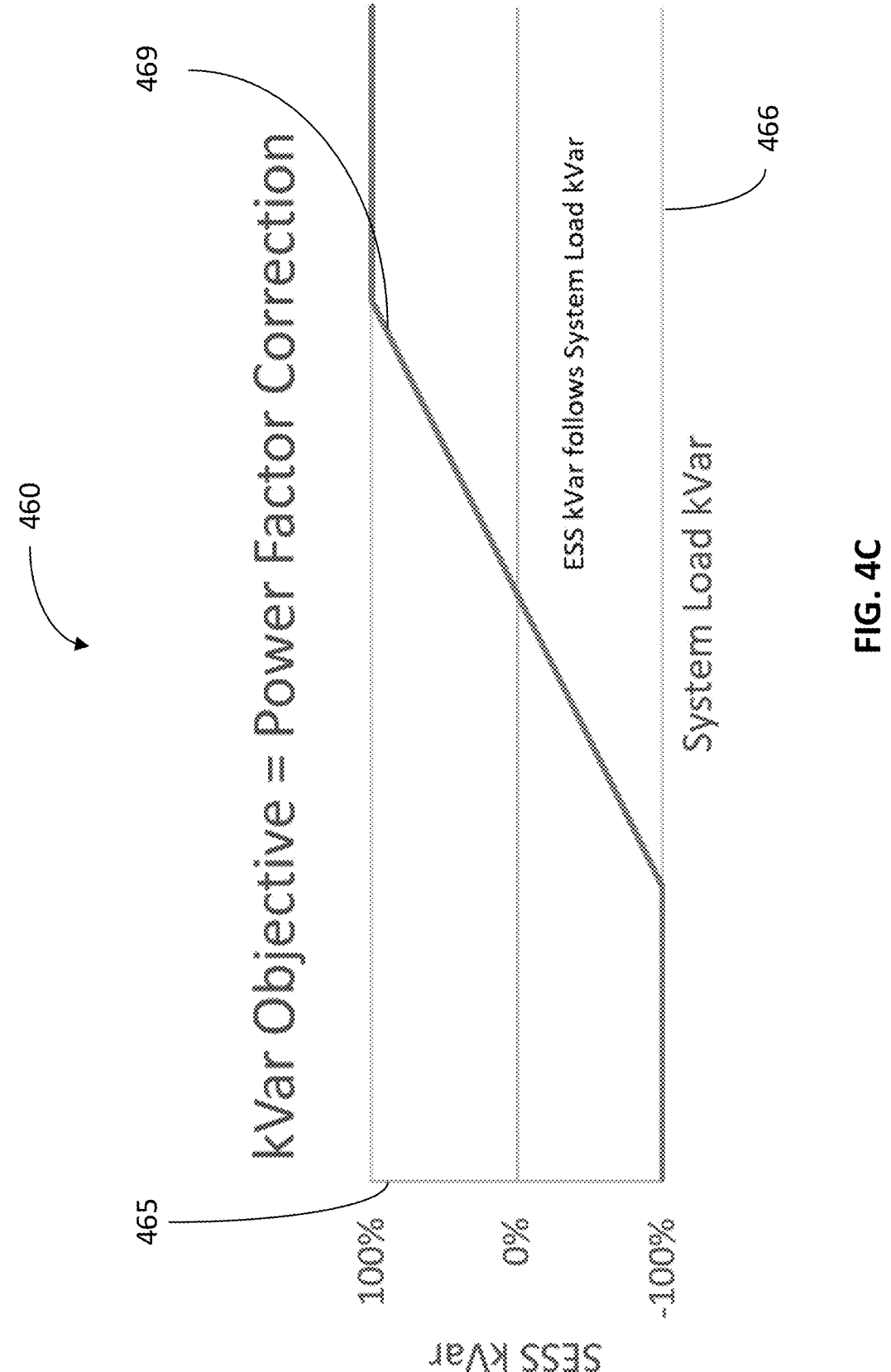
FIG. 4C depicts a droop curve of an ESS according to a second objective that is shown according to an exemplary embodiment.

FIGS. 4B and 4C are referred to in tandem for purposes of demonstration. FIG. 4B depicts a droop curve 450 of an ESS according to a first objective according to an exemplary embodiment. FIG. 4C depicts a droop curve 460 of an ESS according to a second objective that is shown according to an exemplary embodiment. In some embodiments, objectives of the ESS may be set via a user input or command. For example, a user input or command may be transmitted to the ESS via a device (e.g., supervisory controller) via the network or input via a user interface on the ESS controller. The objectives may include multiple different settings for the kilo-watt (kW) output objective and/or the kilovolt-amperes reactive (kVar) output objective.

For example, the objectives for the kW output objective of the ESS may include a charge in accordance with generator constraints setting, a max charge setting, a follow demand setting, a maximized discharge setting, and/or an output kW set point. The charge in accordance with generator constraints setting may indicate to the ESS the goal of charging the ESS while maintaining a limit on the generator power output determined by an upper threshold (e.g., a pre-defined generator kW upper constraint set point). For example, in the charge in accordance with generator constraints setting, the ESS may determine or access a droop curve that allows the ESS to charge when the power average of the gensets (e.g., grid former) is below the upper threshold (e.g., via consuming the difference). The max charge setting may indicate to the ESS to charge as fast as possible without overloading the gensets. For example, in the max charge setting, the ESS may determine a droop curve (e.g., droop curve 410) that designates the ESS to charge using all of the kW available from the gensets without overloading the gensets. The power average from the gensets may be used to determine the amount of kW available for charging. In the maximum discharge setting, the ESS may determine or access a droop curve (e.g., curve 412) that allows for the ESS to output as much power as possible up to a zero (e.g., or pre-defined lower generator load limit) generator load (e.g., which is indicated to the ESS by the power average). In the output kW set point setting, the ESS may maintain a desired or pre-defined kW output.

As an illustrative example, FIG. 4B depicts a droop curve graph 450 in the follow demand setting. The graph 450 includes a y-axis 455 that indicates a kW output of the ESS in the follow demand setting, an x-axis 456 that indicates a system load kW, and a droop curve 459. The system load kW may be indicated to the ESS via a received power average from the gensets (e.g., grid former) or determined via sensing at the output. In the follow demand setting the ESS may determine or access a droop curve such that the ESS will limit the power of the gensets (e.g., determined by the ESS based on the power average) within a lower threshold 451 (e.g., a pre-defined generator kW lower constraint set point) and the upper threshold 452. If the power average exceeds the upper threshold 452 or is below the lower threshold 451, the ESS will attempt to provide or consume the difference in order to keep the power average of the gensets within the range of the lower and upper threshold. The shape of droop curve (e.g., droop curve on the graph 450) may be flattened out at +/−100% to limit output to safe levels regardless of bus fluctuations.

Further, the objectives for the kVar output objective of the ESS may include a power factor correction setting and/or an output kVar set point. In the output kVar set point, the ESS may maintain or attempt to maintain a desired pre-defined kVar output. Further, as an illustrative example, FIG. 4C depicts a droop curve graph 460 in the follow demand setting. The graph 460 includes a y-axis 465 that indicates a kVar output of the ESS in the power factor correction setting, an x-axis 466 that indicates a system load kVar, and a droop curve 469. In the power factor correction setting, the ESS may supply kVars to load to maintain or attempt to maintain a unity power factor for the gensets. Further, the ESS may limit a kVar output so not to exceed the kVar rating of the ESS (e.g., indicated by the flattened droop curve at the maximum and minimum). It is to be appreciated that the kW demand may take priority over the kVar demand or objective when the ESS is at upper constraints of the hardware ratings. In the output kVar set point, the ESS may maintain or attempt to maintain a desired pre-defined kVar output.

Figure 5:
FIG. 5 is a flow diagram of a method of voltage and hertz (V/Hz) control of an ESS according to an exemplary embodiment.
Figure 5:
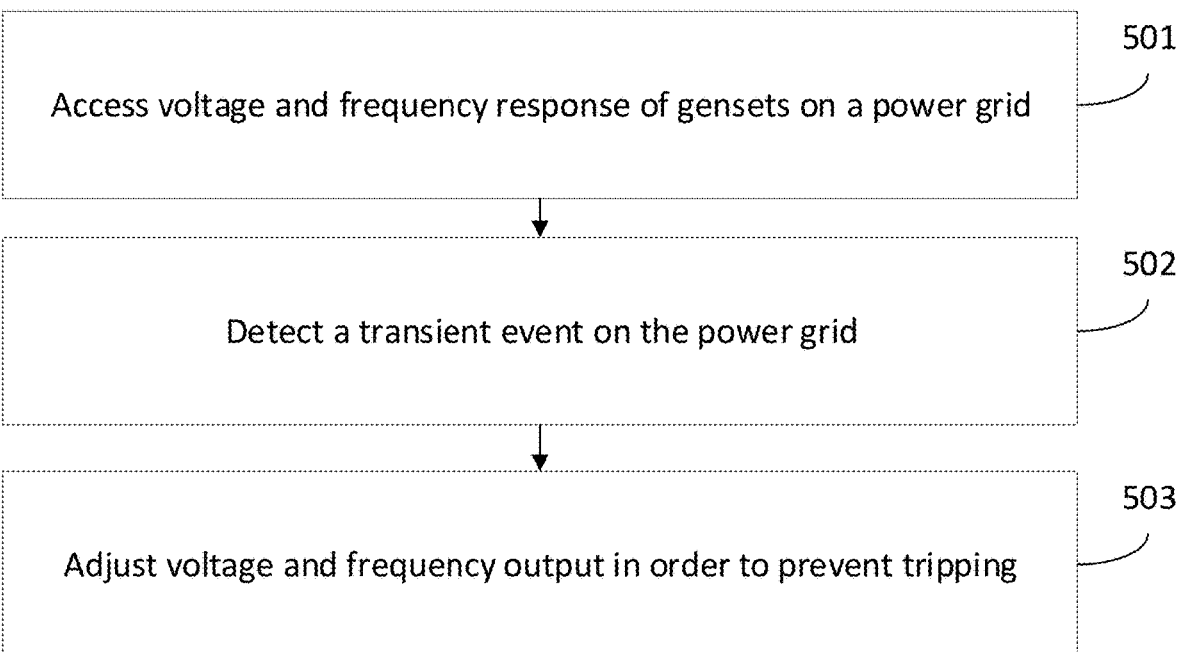

Referring now to FIG. 5, a flow diagram of a method 500 of voltage and hertz (V/Hz) control of an ESS is shown according to an exemplary embodiment. The method 500 describes a method of controlling the output electrical parameters (e.g., voltage and frequency) of the ESS in response to experiencing a transient event. In particular, a solid state inverter (e.g., as the inverters on an ESS) will output a frequency and voltage according to set parameters (e.g., nominal values of the power grid) within the controller. However, when a transient event occurs on a power grid (e.g., turning on of a large load), gensets on the power grid experience the increased load and slow down (e.g., thereby decreasing the output frequency and/or voltage of the power on the grid). As a result, the ESS reacts and outputs power at the nominal values of the power grid, which, if the load is too large, may cause the ESS to trip, fault, or otherwise disconnect (e.g., because the ESS is attempting to absorb the full load). The disconnection of the ESS during the transient event may cause other ESSs on the grid to also fail, trip, or disconnect, resulting in a cascading failure. Accordingly, the method 500 describes a method of dynamically and automatically reducing the output voltage and/or frequency of an ESS to mimic the reaction of the genets to the transient event in order to prevent tripping during transient events. Further, a coordinated V/Hz response between the ESS and the genset may also reduce an amount of reactive power flow between the power sources and improve the overall response of the system.

In operation 501, the ESS accesses voltage and frequency response of gensets on a power grid. For example, the ESS may receive from a grid forming genset the power capacity, power average, or information regarding a function of how a transient event may affect the grid forming genset (e.g., or the system as a whole). In some embodiments, the voltage and frequency response of gensets on the power grid may be stored in a memory on the ESS. In some embodiments, the ESS may dynamically calculate or estimate a function of how a transient event may affect the voltage and/or frequency output of gensets on the power grid based on the power capacity, power average, or other information regarding the gensets.

In operation 502, the ESS may detect that a transient event on the power grid is occurring. For example, the ESS may detect that the frequency and voltage are deviating from nominal values. In some embodiments, the ESS may determine the extent of the transient event (e.g., the extremity of the transient event) based on the amount that the frequency and voltage are deviating from the nominal values. In some embodiments, the ESS may receive via a communication from another device such as a supervisory controller, that a large transient event is occurring or about to occur (e.g., an indication that a large load is about to be or is being connected to the grid). In response, for example, to prepare for a large load connection (e.g., a predefined size of the load), the ESS may load the gensets as much as possible or by a predefined amount based on the size of load (e.g., via outputting less electrical power or consuming power and thereby causing the gensets to increase power output to maintain grid stability) in order to avoid lag in the horsepower response of the gensets. Once the large load is connected, the ESS may detect that the large load has been connected (e.g., via detecting conditions on the power grid) or receive an indication from a device (e.g., such as the supervisory controller) and begin to increase the amount of power output from the ESS to absorb the transient event caused from the large load connection. For example, the ESS may automatically switch from charging to discharging or increase a power discharge amount by an amount that will allow for the large load to be connected such that the genset loads (e.g., increased genset loads) remain relatively unchanged. For example, the exact amount of power output change may be based on the power output capabilities of the ESS and the predefined (e.g., received indication) of the size of the large load. In this way, the large transient event (e.g., an addition of a large load) can be handled proactively by the power sources on the grid, which improves grid stability.

In operation 503, the ESS may adjust the frequency and voltage of the output power of the ESS. For example, the ESS may adjust the frequency and voltage of the output power to mimic the frequency and voltage response of the gensets. In this way, the ESS may provide necessary support to the power grid during the transient event while reducing reactive power flow between the sources and also reducing the potential of a fault that would cause the ESS to disconnect. The ESS may adjust the frequency and voltage of the output power according to the function estimated, determined, or accessed in operation 501. In some embodiments, the ESS may not follow a function, rather the ESS may match the detected frequency and voltage on the power grid and output maximum power while continuously (e.g., or iteratively) adjusting the output frequency and voltage of the ESS to match the current frequency and voltage output of the power grid (e.g., which should be returning to nominal as the genset has time to react and catch up). In some embodiments, the frequency and voltage of the output of the ESS may have a minimum threshold (e.g., −10%) that the ESS will not fall below (e.g., or try to match below that minimum threshold) regardless of the detected frequency and voltage on the power grid.

Figure 6:
FIG. 6 is a flow diagram of a method for an ESS power save mode according to an exemplary embodiment.
Figure 6:
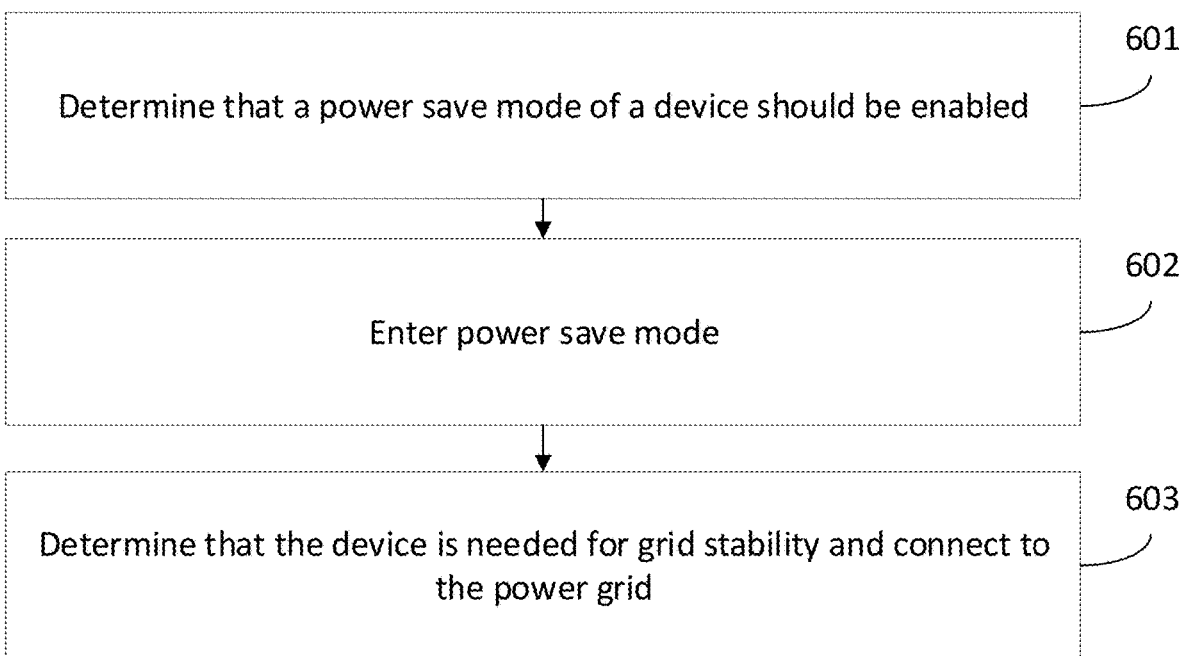

Referring now to FIG. 6, a flow diagram of a method 600 for an ESS power save mode is shown according to an exemplary embodiment. That is, in some embodiments, the ESS may include a power save mode. The power save mode may be a mode during operation (e.g., while connected to the power grid) where the ESS is available, but gated such that the ESS is not outputting or receiving power. That is, in the power save mode, the ESS may be connected to and monitoring electrical parameters on the grid (e.g., via a bus), but dormant to avoid switching losses.

In operation 601, the ESS determines that the power save mode should be started. The power save mode may automatically be entered by the ESS when the ESS detects for a pre-defined amount of time that no power is demanded from the ESS and no power is needed to charge the ESS. In some embodiments, the ESS may determine that the power save mode should be started in response to receiving a manual input or a command from a user or computing device of a user. In some embodiments, the ESS may determine that other power sources are connected to the power grid and the power demand on the ESS below a lower threshold (e.g., a pre-defined value) or in a predefined lower range (e.g., 0-20% power output of capacity) and, in response, determine that the ESS can stop outputting power and enter the power save mode. For example, the ESS may determine that other power sources are connected to the power grid via receiving a power average (e.g., a filtered power average from a grid forming genset) from the other power sources.

In operation 602, the ESS enters the power save mode in response to the determination made in operation 601. The power save mode may gate the ESS from the power grid, which may reduce parasitic power consumption. In some embodiments, the ESS may cause a switch to open such that the ESS is electrically disconnected from the power grid. However, while in the power save mode, the ESS may monitor the frequency and voltage of the electrical power on the power grid.

In operation 603, the ESS may determine that the ESS is needed for grid stability and reconnect to the grid. For example, the ESS may monitor the frequency and voltage of the electrical power on the power grid for a deviation from a nominal range (e.g., +/−3% from nominal values). In response to detecting that the frequency and/or voltage has deviated from the nominal range, the ESS may gate back onto the power grid until grid stability is restored and ESS power demand has subsided (e.g., the frequency and voltage of the power grid return to the nominal range). For example, the ESS may cause a switch to close that reconnects the ESS to the power grid in operation 603 such that the ESS can provide grid stability via outputting or receiving power.

Figure 7:
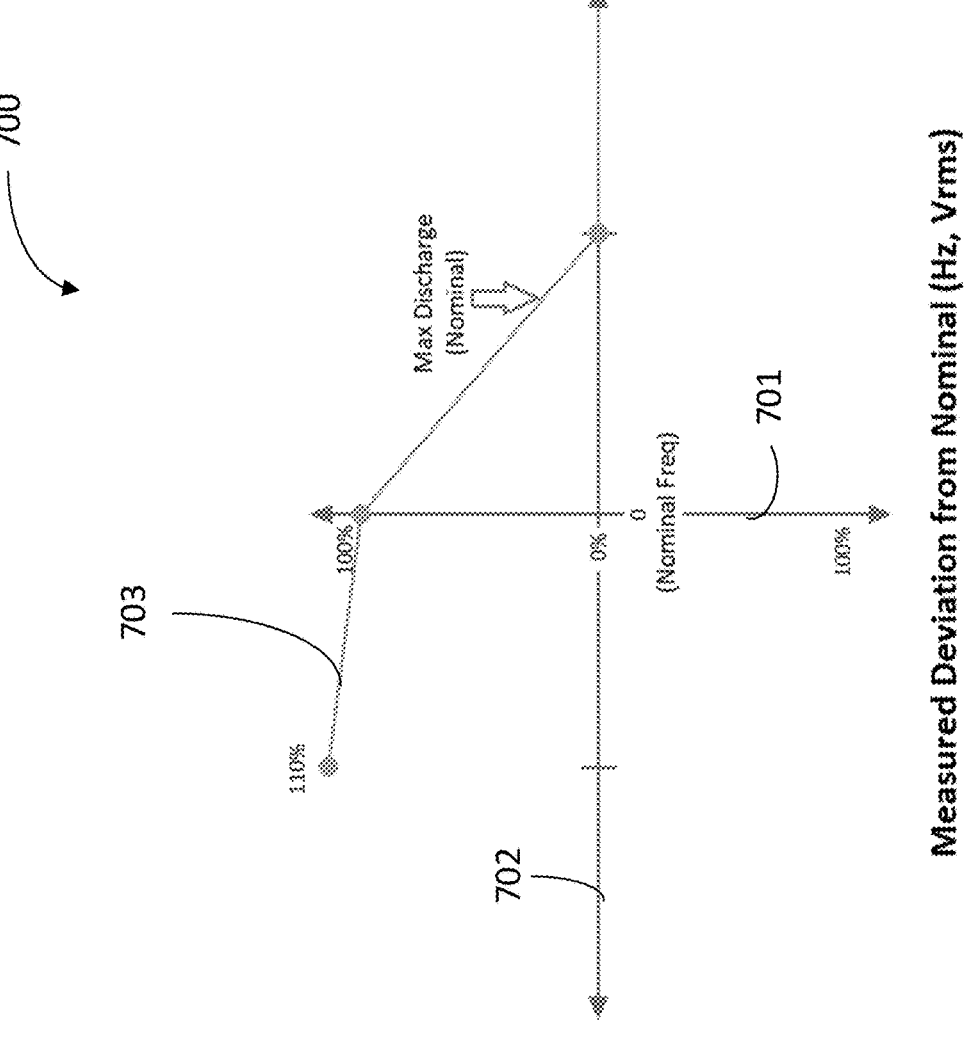
FIG. 7 is a graph of a droop curve of a one-way power source according to an exemplary embodiment.

Referring now to FIG. 7, a graph 700 of a one-way power source is depicted. For example, the one way power source may include a solar power source, a wind power source, or other renewable power source that is configured to connect to the power grid and output power to the grid. In other words, the one-way power source may only be configured to output power to the power grid and not to receive power from the power grid.

The graph 700 includes a y-axis 701 that indicates a power output level of the one-way power source (e.g., in % kW and % kVar) and an x-axis 702 that indicates the values of the electrical power on the power grid (e.g., the frequency and/or voltage of the electrical power). The graph 700 also includes a droop curve 703 that indicates the response of power output level of the one-way power source relative to the detected, monitored, or determined values of the electrical power on the power grid. That is, the droop curve 703 may be set or dynamically determined within a controller of the one-way power source such that the one-way power source is configured to maximize their power output as long as the electrical power is being consumed by an ESS on the power grid or load.

For example, when the one-way power source determines or detects that the frequency and/or voltage on the power grid are at nominal values (e.g., 60 Hz and/or 240V), the one-way power source is configured to output the maximum amount (e.g., or be momentarily overloaded, which may support grid stability) of power possible to the power grid (e.g., 100%). In this way, when the power grid is operationally steady (e.g., operating with the electrical power at the nominal values) the one-way power source (e.g., renewable power source) is outputting a maximum amount of renewable power to the power grid, which ensures that the grid is supported by as much renewable energy as possible. The droop curve 703 indicates that the one-way power source will curtail the output power as the frequency or voltage exceeds the nominal values, which allows for the one-way power source to react to grid transients such that the grid stability is maintained. It is to be appreciated that the slope of the droop curve 703 or the exact function of the droop curve 703 may be set or dynamically adjusted to ensure that grid stability is maintained. For example, the slope of the droop curve beyond the nominal values may be increased in particular implementations (e.g., implementations having large expected transients) or reduced in other implementations. After a transient event, the one-way power source may iteratively or continuously adjust the power output back to the maximum (e.g., 100%) in order to ensure that the maximum amount of renewable power is being used, which increases the efficiency of the power grid. In this way, the one-way power source may actively push (e.g., output more power) power onto the power grid such that the other power sources can reduce the respective output powers and maximize the efficiency of the grid. For example, the power sources (e.g., one way power source and/or gensets) can implement a local limited reverse power flow control algorithm to accommodate for the slower network (e.g., due to limited bandwidth) with higher latencies and actively work toward a nominal balanced steady state without communication over the network.

Similar to as explained above in reference to the user-defined or supervisory defined objectives of the ESS. The one way power source may also have objectives defined by a user input or via a supervisory controller. For example, the one way power source may have kW objectives of maximum export and/or output kW set point. Moreover, the one way power source may have kVar objectives of power factor correction or an output kVar set point setting. The one way power source, with the maximum export kW setting may target a 100% power output. However, as discussed below, may not export 100% power output if the gensets are below a lower load limit or at 0% power output. The one way power source, with the output kW setting, may output a predefined magnitude of kW. Similar, the one way power source, with the output kVar setting may output or attempt to output a predefined amount of magnitude of kVar. Further, the one way power source, with the power factor correction setting, may output as much kVars as possible in attempt to maintain a unity power factor for the gensets.

As another example, the one-way power source may determine a power average, filter the power average to a suitable network rate (e.g., as explained in reference to FIGS. 2 and 3) and transmit the power average to the other power sources. The other power sources may use the power average of the one-way power source to curtail power output (e.g., if the one-way power average indicates that the one-way power source is not outputting a power average above 50%) such that the one-way power source will respond to the curtailed power (e.g., sensed or determined by the one-way power source as a drop of frequency and/or voltage on the grid) by increasing the power output of the one-way power source to a maximum amount, thereby again maximizing the efficiency of the power grid.

As another example, the one way power source may receive the power average (e.g., filtered power average) from one or more of the other power sources (e.g., from the grid forming genset) and use the power average to maximize operating conditions. For example, the power average may indicate that the grid forming genset is at or near a lower threshold that indicates a minimum load requirement of the genset or that the genset is not outputting any power (e.g., a 0 power average). In response, the one way power source (e.g., inverter of the solar or wind power source) may curtail the power output of the solar or wind power source such as to prevent reverse power flow to the gensets. For example, the one way power source may receive the power average, determine that the power average is below a threshold (e.g., a predefined threshold), and in response, lower the power output of the one way power source such that the gensets are not receiving reverse power flow or are above a minimum load threshold. The one way power source may iteratively curtail the power output in response to each power average received or may curtail the power output by an amount that is related to the amount that the power average is below the threshold. In this way, the one way power source may use the power average to maximize operating conditions and longevity of the gensets or other power sources.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
determining, by a first genset connected to a power grid, a power parameter at a first rate, wherein the power parameter represents a current power output of the first genset relative to a total power capacity of the first genset;
generating, by the first genset using a low pass filter, a filtered power parameter, wherein the filtered power parameter is the power parameter at a second rate different from the first rate; and
transmitting, by the first genset to a second genset, the filtered power parameter that allows the second genset to adjust a power output of the second genset such that a filtered power parameter of the second genset is adjusted toward the filtered power parameter of the first genset.

2. The method of claim 1, further comprising, transmitting, by the first genset over a network, the power parameter at the second rate to one or more other power sources connected to the power grid.

3. The method of claim 1, further comprising:
receiving, at the second genset via a network to which the first genset and the second genset are connected, the filtered power parameter; and adjusting, at the second genset, the power output of the second genset such that the filtered power parameter of the second genset is adjusted toward the filtered power parameter of the first genset.

4. The method of claim 1, further comprising increasing, at the second genset, the power output of the second genset in response to determining that the filtered power parameter of the second genset is lower than the filtered power parameter of the first genset.

5. The method of claim 1, further comprising decreasing, at the second genset, the power output of the second genset in response to determining that a power parameter percentage of the second genset is higher than a power parameter percentage of the first genset.

6. The method of claim 1, further comprising:
receiving, at an energy storage system (ESS), the filtered power parameter; and
adjusting, at the ESS, set points of a droop curve of the ESS, wherein the set points affect a response of the ESS to sensed electrical parameters on the power grid.

7. The method of claim 6, wherein adjusting the set points of the droop curve comprises setting the set points to a maximum charge configuration in response to the filtered power parameter being below a lower threshold.

8. The method of claim 7, wherein the lower threshold is indicative that the first genset is at minimum load requirement of the first genset.

9. The method of claim 6, wherein adjusting the set points of the droop curve comprises setting the set points to a maximum discharge configuration in response to the filtered power parameter being above an upper threshold.

10. The method of claim 1, wherein generating the filtered power parameter comprises low pass filtering, based on a cutoff frequency associated with a network rate of a network to which the first genset is connected, the power parameter that is determined at the first rate.

11. A power source configured to be coupled to a power grid, the power source comprising:
a sensor configured to monitor a parameter of the power source; and
a controller configured to:
determine, based at least in part on the parameter, a power parameter of the power source at a first rate, wherein the power parameter represents a current power output of the power source relative to a total power capacity of the power source;
generate a filtered power parameter using a low pass filter, wherein the filtered power parameter comprises the power parameter at a second rate different from the first rate; and
transmit the filtered power parameter to a remote power source.

12. The power source of claim 11, wherein the controller is further configured to:
determine a voltage or frequency response of the power source on the power grid;
detect a predetermined event on the power grid based on the voltage or frequency response; and
adjust a voltage or frequency output of the power source in response to a detection of the predetermined event.

13. The power source of claim 12, wherein the controller is further configured to filter off a higher frequency component of the power parameter to adjust the voltage or frequency output of the power source.

14. The power source of claim 11, wherein the controller is further configured to start a power save mode in response to determining that a power demand on the power source is below a threshold.

15. The power source of claim 14, wherein the controller is further configured to electrically disconnect the power source from the power grid during the power save mode.

16. A system comprising:

a first power source configured to be coupled to a power grid; and a first controller configured to:

determine a power parameter of the first power source at a first rate, wherein the power parameter represents a percentage of a current power output of the first power source relative to a total power capacity of the first power source;

generate a filtered power parameter using a low pass filter, wherein the filtered power parameter is the power parameter at a second rate different from the first rate; and transmit the filtered power parameter to one or more other power sources connected to the power grid, the filtered power parameter allowing the one or more other power sources to adjust a power output of the one or more other power sources such that a filtered power parameter of the one or more other power sources is adjusted toward the filtered power parameter of the first power source.

17. The system of claim 16, further comprising a second power source configured to be coupled to the power grid and communicably coupled to the first power source, the second power source comprising:

a second controller configured to:

receive the filtered power parameter of the first power source; and adjust the power output of the second power source such that a filtered power parameter of the second power source is adjusted toward the filtered power parameter of the first power source.

18. The system of claim 17, wherein the second controller is further configured to change the power output of the second power source based on the filtered power parameter of the second power source and the filtered power parameter of the first power source.

19. The system of claim 16, further comprising an energy storage system (ESS) coupled to the power grid and communicably coupled to the first power source, the ESS comprising:

a second controller configured to adjust one or more parameters of the ESS, the one or more parameters associated with a response of the ESS to sensed electrical parameters on the power grid.

20. The system of claim 19, wherein the second controller is further configured to adjust the one or more parameters of the ESS to start a maximum charge droop state in which the ESS is configured to receive power from the power grid.

* * * * *